United States Patent
Todasco (10) Patent No.: US 9,720,381 B2
(45) Date of Patent: Aug. 1, 2017

(54) UNPREDICTABLE TIME CLOCK

(71) Applicant: PAYPAL, Inc., San Jose, CA (US)

(72) Inventor: Michael Charles Todasco, Santa Clara, CA (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 14/849,400

(22) Filed: Sep. 9, 2015

(65) Prior Publication Data
US 2017/0068224 A1    Mar. 9, 2017

(51) Int. Cl.
| | |
|---|---|
| *G04G 5/00* | (2013.01) |
| *G04G 9/00* | (2006.01) |
| *G04G 21/02* | (2010.01) |
| *G04R 20/00* | (2013.01) |
| *H04W 4/02* | (2009.01) |
| *G06Q 10/10* | (2012.01) |
| *G04G 21/04* | (2013.01) |

(52) U.S. Cl.
CPC .............. *G04G 9/00* (2013.01); *G04G 21/02* (2013.01); *G04G 21/025* (2013.01); *G06Q 10/109* (2013.01); *G04G 5/00* (2013.01); *G04G 21/04* (2013.01); *G04R 20/00* (2013.01); *H04W 4/02* (2013.01)

(58) Field of Classification Search
CPC .. G04G 5/00; G04G 5/04; G04G 9/00; G04G 9/02; G04G 9/025; G04G 21/00; G04G 21/04; G04G 21/02; G04R 20/00; G04R 20/08; H04W 4/02
See application file for complete search history.

(56) References Cited

U.S. PATENT DOCUMENTS

| | | | | |
|---|---|---|---|---|
| 4,901,296 A | * | 2/1990 | Mitchell | G04G 99/00 368/185 |
| 4,956,829 A | * | 9/1990 | Mitchell | G04G 99/00 368/185 |
| 6,771,990 B1 | * | 8/2004 | Nilsson | H04M 1/72519 342/386 |
| 9,234,762 B2 | * | 1/2016 | Meisels | G06F 17/30241 |
| 9,386,420 B2 | * | 7/2016 | Takehara | H04W 4/02 |
| 2006/0218029 A1 | * | 9/2006 | Chin | G06Q 10/109 705/80 |
| 2008/0112269 A1 | * | 5/2008 | Lawton | G04G 5/002 368/10 |
| 2008/0167938 A1 | * | 7/2008 | Meisels | G06Q 10/063116 705/7.16 |
| 2011/0137954 A1 | * | 6/2011 | Diaz | G06Q 10/00 707/803 |
| 2012/0108268 A1 | * | 5/2012 | Lau | G06Q 10/109 455/456.3 |
| 2014/0206328 A1 | * | 7/2014 | Varoglu | H04W 4/028 455/418 |

(Continued)

*Primary Examiner* — Vit W Miska
(74) *Attorney, Agent, or Firm* — Haynes and Boone, LLP (57) ABSTRACT

Systems and methods for displaying an adjusted time to a user are provided. A time display device that normally displays the correct time is used to display a modified time. This modified time is unknown to the user so that the user cannot know what the time offset is and is forced to assume that the current time is displayed. The modified time may be an advanced time or a time that is set backwards, depending on when the user wants to arrive at an event.

20 Claims, 3 Drawing Sheets

(56) References Cited

U.S. PATENT DOCUMENTS

| | | | |
|---|---|---|---|
| 2014/0278057 A1* | 9/2014 | Berns | G01C 21/3484 701/410 |
| 2015/0038171 A1* | 2/2015 | Uilecan | G06Q 10/109 455/456.3 |
| 2016/0148164 A1* | 5/2016 | Luk | H04W 40/28 705/7.19 |

* cited by examiner

UNPREDICTABLE TIME CLOCK

BACKGROUND

Field of the Invention

The present invention generally relates to setting a clock time, and more specifically to setting the clock time for a user to a time different than the actual time.

Related Art

Watches, clocks, and the like keep track of the passage of time, indicating hours, minutes, and sometimes seconds, typically by hands or by displayed figures. Many users may set the time of the clock ahead by a known amount in an attempt to deceive themselves into thinking the time is actually later than it really is. This technique, however, is often ineffective because the person knows exactly how much time has been added to the clock. In that case, the advanced time that is displayed does nothing to change the person's behavior.

Accordingly, a need still exists for systems and methods that provide an adjusted time to make a user behave in a certain way.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods that present erroneous information to make a user behave in a certain way. In particular, a service provider (or a time display device) adjusts a current displayed time depending on the situation of a user. The current time is adjusted or changed to provide the user with sufficient time to take a particular action, such as travel to or attend an event. For example, a user is preparing to go to work, attend a meeting, or go to a doctor's appointment, and a clock is adjusted 2-10 minutes ahead of the current time. The user glances at the clock, notices the time, and hustles to get himself or herself out the door because of the advanced time. Advantageously, the user does not know how far in advance the time is adjusted so the user does not know the real time and cannot reason that he or she still has time to spare because the real time is unknown. The adjusted time may appear on all clocks the user is likely to encounter during the corresponding time period, such as on the user's watch, smart phone, home clock, office clock, automobile clock, and the like.

The present disclosure introduces uncertainty into the time being displayed. Typically, a user wants a clock to show the most accurate time. Thus, the idea of intentionally introducing error into the time-keeping process is unusual. A time display device (e.g., clock, watch, smartphone, smartwatch, etc.) that normally displays the correct time functions as a useful timepiece, but can also be set to display a modified time. This modified time is unknown to the user so that the user cannot know what the time offset is and is forced to assume that the current time is displayed. The ability to add in and remove a random time offset for the clock enables this clock to function as an accurate time piece during normal operation (e.g., about 99% of the time) while also displaying a modified time when needed (e.g., about 1% of the time). In various embodiments, the time is seldom modified so that the user believes the displayed time is always the actual, current time. If the time is constantly changed, the user will not believe the displayed time is the real time, and his or her behavior will not change as the user will have learned to ignore the clock.

The present disclosure provides systems and methods for helping people meet scheduled appointments at predetermined times by providing a random change of the time so the person will perceive less time to get prepared than they actually have. However, unlike "setting the clock ahead," the person will not know how far changed the actual time is. As a result, the person will have to assume that the time displayed on the clock is the actual time. The urgency to get up and out the door is therefore not contravened by knowledge of the time advancement.

According to various embodiments, the time adjustment function of the time display device can be turned on or off by the user. The user can choose to turn on the time adjustment function at night so that when the user wakes up in the morning, the user will see the adjusted or changed time. In another embodiment, the user can turn on the time adjustment function a few hours or several minutes before an important event or occasion so that the user views the adjusted time closer to the event or occasion.

The present methods and systems may be used as a tool to change a person's behavior. The methods and systems determine whether an event is going to occur within a predetermined time of the current time, determine the current time and a current location of the user, adjust the current time based on a time of the event, the current location, and the current time, and display the adjusted time to the user. The event can include any type of appointment, meeting, party, and can include everyday tasks such as going to work and picking up a child from school or daycare.

Figure 1:
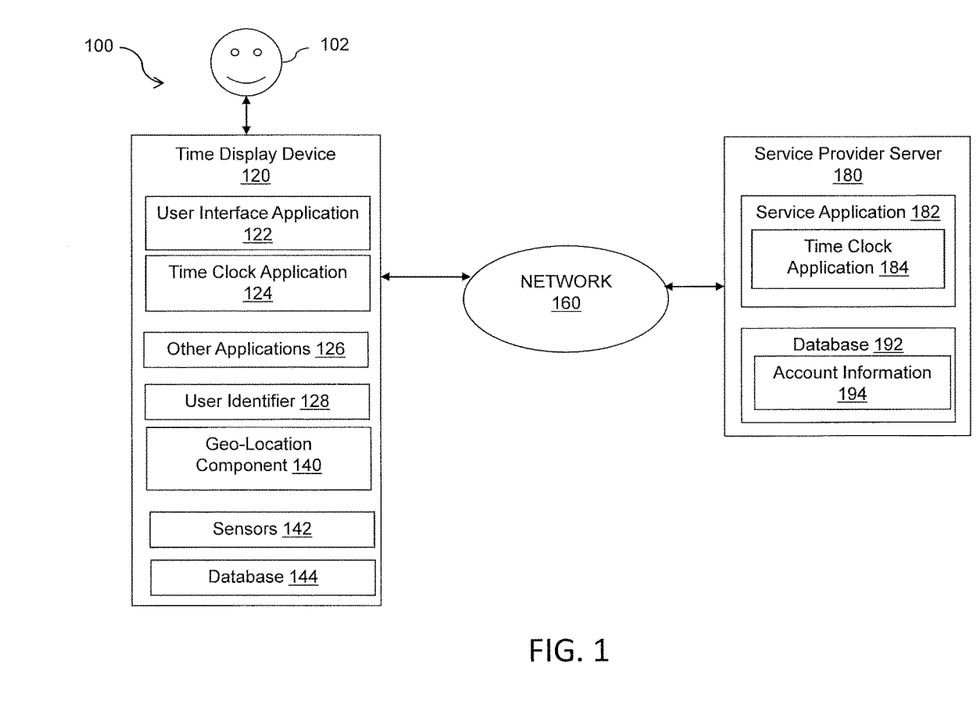
FIG. 1 is a block diagram illustrating a system for displaying an adjusted time according to an embodiment of the present disclosure.

FIG. 1 shows one embodiment of a block diagram of a network-based system 100 that is configured to display an adjusted time according to an embodiment of the present disclosure. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, system 100 includes a time display device 120 (e.g., a smartphone or smart watch) and at least one service provider server or device 180 (e.g., network server device) in communication over a network 160. Network 160, in one embodiment, may be implemented as a single network or a combination of multiple networks. For example, in various embodiments, network 160 may include the Internet and/or one or more intranets, landline networks, wireless networks, and/or other appropriate types of communication networks. In another example, network 160 may comprise a wireless telecommunications network (e.g., cellular phone network) adapted to communicate with other communication networks, such as the Internet.

Time display device 120, in one embodiment, is utilized by a user 102 to interact with service provider server 180 over network 160. For example, user 102 may transmit event information to service provider server 180 via time display device 120. Time display device 120, in various embodiments, may be implemented using any appropriate combination of hardware and/or software configured for wired and/or wireless communication over network 160. In various implementations, time display device 120 may include at least one of a smartphone, wireless cellular phone, satellite phone, tablet (e.g., iPad™ from Apple®), laptop computer, wearable device (e.g., smart watch or Google Glass), notebook computer, hybrid/convertible computer, personal computer (PC), and/or other types of computing devices that can display the time. In some embodiments, time display device 120 includes any networked clock, including, but not limited to, clocks that are networked in a house (e.g., clock on a microwave, oven, etc.) or a clock in a vehicle.

Time display device 120, in one embodiment, includes a user interface application 122, which may be utilized by user 102 to access applications (e.g., a time clock application 124) and to provide instructions to service provider server 180 over network 160. In one aspect, user 102 may login to an account related to user 102 via user interface application 122.

In one implementation, user interface application 122 comprises a software program, such as a graphical user interface (GUI), executable by a processor that is configured to interface and communicate with service provider server 180 via network 160. In another implementation, user interface application 122 comprises a browser module that provides a network interface to browse information available over network 160. For example, user interface application 122 may be implemented, in part, as a web browser to view information available over network 160.

Time display device 120, in several embodiments, includes time clock application 124, which displays time information such as the local time and date to user 102. Time clock application 124 may be developed by a service provider. Time clock application 124 may be downloaded to time display device 120 from an app store and/or from a service provider website and installed on time display device 120. The time clock application 124 may display the local time for the time display device 120 in 12-hour notation format indicating ante meridiem (am) or post meridiem (pm) along with the date in (m)m/(d)d/yy format. The time information presented to the user, however, may include more or less information and may be displayed using various formats.

The time clock application 124 may comprise or be implemented by one or more hardware components, software components, firmware components, and/or combination thereof. For example, the time clock application 124 may be implemented by a computer program stored on one or more types of computer-readable storage media to be executed by one or more processors of the time display device 120. In some implementations, the time clock application 124 may include a dedicated application program or system program for maintaining and/or indicating time for the time display device 120. In other implementations, the time clock application 124 may include part of an application program or system program capable of maintaining and/or indicating time in addition to performing other computing and processing operations for the time display device 120.

To maintain and display accurate time information, the time display device 102 and/or the time clock application 124 may store and manage various types of time data such as data representing the time of day (e.g., hours, minutes, and/or seconds) in 12-hour or 24-hour notation, data representing the day of the week, data representing the date, Coordinated Universal Time (UTC) data, time zone data representing a particular time zone (e.g., EST, CST, MST, PST) and/or a positive or negative UTC offset, location data (e.g., country, city, coordinates), daylight savings time (DST) data, and/or other time data. In various implementations, the local time displayed by the time clock application 124 may be derived from time data representing UTC, a time zone offset to the UTC (e.g., −8 for PST), and a DST offset to the UTC (e.g., +1) when daylight savings time is in effect for the time zone.

In various embodiments, the time display device 120 may receive or acquire time data from multiple sources. One source of time data may include input from the user 102 on time display device 120. For example, the user 102 may manually input time data (e.g., time, date, location, etc.) to the time clock application 124 using a keypad of the time display device 120. In some cases, the user 102 may manually input initial time data to the time clock application 124. In other cases, the user 102 may manually input new time data in order to overwrite existing time data so that more accurate time information is displayed by the time clock application 124.

The time clock application 124 may include a check box to provide the user 102 of the time display device 120 with an option to enable or disable a time adjustment function. In some implementations, the time adjustment function may be enabled by default and/or may occur automatically. In various embodiments, the time clock application 124 adjusts the displayed time based on certain factors, such as whether user 102 has an upcoming event to attend, user 102's location, the current time, user 102's past behavior, weather, traffic, location of the event, etc. Time clock application 124 may also link to different data sources (e.g., weather websites, traffic websites, etc.) to determine an adjusted time.

Time display device 120, in various embodiments, may include other applications 126 as may be desired in one or more embodiments of the present disclosure to provide additional features available to user 102. In one example, such other applications 126 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, other applications 126 may interface with user interface application 122 for improved efficiency and convenience.

Time display device 120, in one embodiment, may include at least one user identifier 128, which may be implemented, for example, as operating system registry entries, cookies associated with user interface application 122, identifiers associated with hardware of time device 120, or various other appropriate identifiers. User identifier 128 may include one or more attributes related to user 102, such as personal information related to user 102 (e.g., one or more user names, passwords, photograph images, biometric IDs, addresses, phone numbers, social security number, etc.). In various implementations, user identifier 128 may be passed with a user login request to service provider server 180 via network 160, and user identifier 128 may be used by service provider server 180 to associate user 102 with a particular user account maintained by service provider server 180.

Time display device 120, in various embodiments, includes a geo-location component 140 configured to determine, track, monitor, and/or provide an instant geographical location of time display device 120. Time display device 120 can determine a current location of time display device 120 using various location determination techniques. For example, time location device 120 can determine a current location using a Global Positioning System (GPS) signal, by triangulating positions of wireless access points, or by a current cell identifier of a cellular communications network.

In one implementation, the geographical location may include GPS coordinates, zip-code information, area-code information, street address information, and/or various other generally known types of location information. In one example, the location information may be directly entered into time display device 120 by user 102 via a user input component, such as a keyboard, touch display, and/or voice recognition microphone. In another example, the location information may be automatically obtained and/or provided by the time display device 120 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using time display device 120 via a check-in device at a location, such as a beacon. This helps to save battery life and to allow for better indoor location where GPS typically does not work.

In various embodiments, time display device 120 includes a wearable device. A wearable device can collect and in some cases, transmit physiological information to service provider server 180. In various implementations, the wearable device includes at least one of an activity tracker (e.g., Flex™ from Fitbit®, UP24™ from Jawbone®, FuelBand™ by Nike®), which may also be called a fitness tracker and/or health tracker, smart watch (e.g., Galaxy Gear™ from Samsung®, Pebble Steel™ from Pebble®), eyeglasses with appropriate computer hardware resources (e.g., Google Glass™ from Google®), and/or other types of wearable computing devices.

Accordingly, time display device 120, in various embodiments, includes one or more sensors 142. Time display device 120 may use sensors 142 to measure, which may include tracking, monitoring, detecting, quantifying, capturing, and/or otherwise measuring, one or more physiological characteristics. Time display device 120 may receive data relating to the physiological characteristics, such as measurements and/or counts of the physiological characteristics, from sensors 142. For example, time display device 120 may receive the physiological data by accessing and/or communicating with sensors 142. Time display device 120 may process, analyze, infer from, and/or interpret physiological data, such as raw data of sensor measurements, to generate additional physiological information.

Sensors 142 may comprise an accelerometer, gyroscope, actimetry sensor, altimeter, pedometer, heart rate sensor, blood pressure sensor, thermometer, an oximeter or other device capable of sensing and/or measuring the presence and/or concentration of oxygen, carbon dioxide, carbon monoxide, and/or the like in the blood, image sensor, thermal camera and/or microphone. The accelerometer that measures acceleration and the gyroscope that measures orientation may be used together to measure movement, such as an activity of user 102. The accelerometer may be used to measure movement while user 102 is asleep to determine sleep patterns and/or circadian rhythms. The actimetry sensor, which includes an accelerometer and is specialized for measuring movement during sleep, may also be used to determine sleep patterns and circadian rhythms. The altimeter measures altitude and may be used to measure an incline of a path traveled by user 102. The pedometer measures a number of steps taken by user 102. The heart rate sensor, blood pressure sensor, and/or thermometer measure vital signs of user 102.

In one aspect, when interfacing with time display device 120, user 102 may elect and/or consent to provide personal information, such as physiological information and/or location information, to service provider server 180. User 102 may set or configure the user settings/configuration menu of the time display device 120. Through the user settings/configuration menu, user 102 may provide consent to share personal information and specify the extent of the shared personal information. Time display device 120 may transmit the physiological information dynamically by push synchronization, periodically, or each time time clock application 124 is opened by user 102. In some embodiments, user 102 may be prompted for permission to release personal information. Accordingly, user 102 may have exclusive authority to allow transmission of physiological information and/or location information from the time display device 120 to service provider server 180.

Time display device 120, in many embodiments, includes a database 144. Time display device 120 may locally store time information data and/or physiological information in database 144. The time information data can include the current date and time, appointment data for user 102, and past user behavior (e.g., whether user 102 is periodically late to work or to appointments). The physiological information, which is based on the physiological characteristics measured by sensors 142, may include physiological data, such as raw data of sensor measurements, the physiological data processed into information relating to physiological characteristics, physiological characteristic history and trends over time, etc.

The physiological information, in many embodiments, includes a variety of types of physiological information. The physiological information may include, for example, sleep-related information, vital sign-related information, activity information, etc. Each type of physiological information may be based on one or more physiological characteristics. One physiological characteristic can be used for more than one type of physiological information. For example, the physiological characteristic of heart rate may be used for sleep-related information, such as to determine whether user 102 is asleep, and also be used for activity information, such as to determine the number of calories burned.

Sleep-related information may include sleep patterns, circadian rhythms, number of hours slept, including number of hours in rapid eye movement (REM) sleep and deep sleep, and/or quality of sleep. Sleep-related information may also include trends and/or averages of each thereof. Sleep-related information may be based on measurements of movement, noise, temperature, heart rate, and/or location of user 102 (e.g., at home or hotel room) by sensors 142.

Activity information may include a number of steps taken, distance traveled by walking, jogging, running, cycling, etc., length of time exercised, and/or calories burned. Activity information may be based on measurements of a step count, incline of path of travel, heart rate, and/or location tracking.

Vital sign-related information may include measured vital signs, measured changes in vital signs, trends and averages over time, and any other information related to vital signs. The vital signs include a heart rate, breathing/respiratory rate, temperature, and blood pressure. The changes in vital signs may be measured to determine whether user 102 is sick or ill.

Time display device 120 may transmit physiological information to another user device (e.g., a PC or laptop) and/or service provider server 180. The other user device and/or the service provider server 180 may further process, analyze, infer from, and/or interpret physiological information to generate additional physiological information. The other user device and/or service provider server 180 can store a physiological history that includes long-term physiological information compiled over time, and physiological trends and averages based on the physiological history.

Time display device 120, in one embodiment, may take into account various non-physiological information, such as a time of day, location of user 102, schedule of user 102, calendar of user 102, etc. when generating and/or processing physiological information. For example, a time of a day (e.g., night time), a location (e.g., at home, at a vacation location, or at a hotel), a day of the year, and/or a combination of information (e.g., at a store at 2 a.m. for the day after Thanksgiving shopping) may be used to determine and/or infer whether user 102 is sick or well.

Service provider server 180, in various embodiments, may be maintained by a service provider that provides online services and/or processing for information transactions. As such, service provider server 180 includes a service application 182, which may be adapted to interact with the time device 120 over the network 160 to facilitate the receipt and analysis of information from time display device 120. In one example, service provider server 180 may be provided by a service provider such as PayPal®, Inc. of San Jose, Calif., USA.

Service provider server 180, in an embodiment, receives time information, physiological information and/or location information from time display device 120. In certain embodiments, service provider 180 directly receives the information from time display device 120 over network 160. In some embodiments, service provider server 180 receives the information by accessing and/or retrieving the information on time display device 120.

Service provider server 180, in one embodiment, may be configured to maintain one or more user accounts in database 192, each of which may include account information 194 associated with one or more individual users (e.g., user 102). Account information 194 may include time information, physiological information and/or location information. In various aspects, the methods and systems described herein may be modified to accommodate users that may or may not be associated with at least one existing user account.

Service application 182, in one embodiment, utilizes a time clock application 184 to determine a time to display to user 102. In various embodiments, the time clock application 184 accesses calendar information from time display device 120 to determine whether user 102 needs to be at a certain place at a certain time, determine where the user 102 is and the current time, analyze if the current time needs to be adjusted, and calculate how much the current time should be adjusted so that user 102 will be at the certain place on time. In other words, the time clock application 184 calculates a time adjustment that is applied to the current time that ensures that user 102 will be on time.

In one implementation, user 102 may have identity attributes stored with service provider server 180, and user 102 may have credentials to authenticate or verify identity with service provider server 180. User attributes may include personal information and/or physiological information. In various aspects, the user attributes may be passed to service provider server 180 as part of a login, search, and/or selection, and the user attributes may be utilized by service provider server 180 to associate user 102 with one or more particular user accounts maintained by the service provider server 180.

Figure 2:
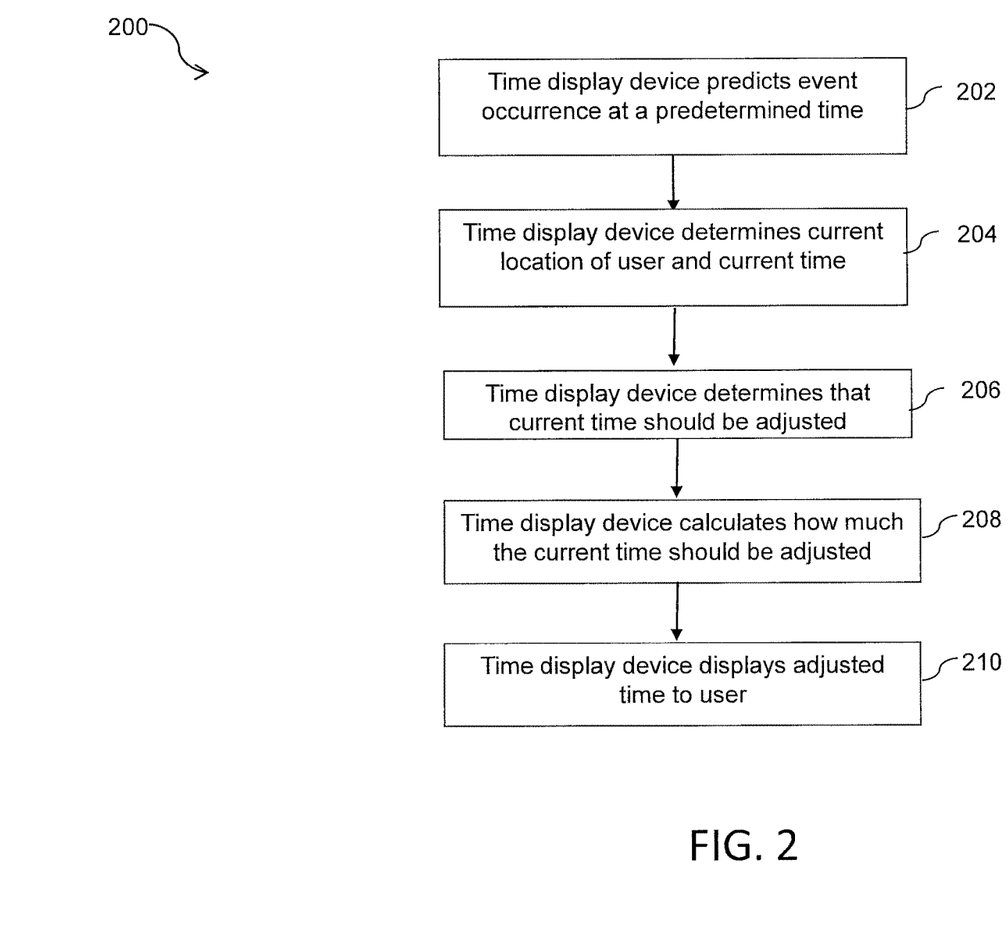
FIG. 2 is a flowchart showing a method of displaying an adjusted time according to an embodiment of the present disclosure.

Referring now to FIG. 2, a flowchart of a method 200 of displaying an adjusted time is illustrated according to an embodiment of the present disclosure. It should be understood that while method 200 is described below as being performed by time display device 120, the method can also be performed by service provider server 180.

At step 202, the time display device 120 predicts that an event will occur at a predetermined time. The time display device can detect a time-related event for user 102 (e.g., a show, flight, appointment, party, wedding, or anything where the user needs to take some action by a certain time). For example, the time display device 120 can access a calendar application, recurring patterns in user behavior, or an intelligent personal assistant application (Google Now, Siri, Cortana, etc.) on the time display device 120 to determine that the user 102 has to go to work, has a doctor's appointment, has a meeting, etc. in a few hours or several minutes.

At step 204, the time display device 120 determines the current location of the user 102 and the current time. For example, the time display device 120 accesses the current time from time clock application 124, database 144, or some other database. Time display device 120, in one embodiment, includes a location determination device (e.g., a GPS device, a cell tower triangulation system device, and/or a variety of other location determination devices known in the art) that is operable to determine a current location of time display device 120.

User 102 may release geo-location information to the time display device 120 (or service provider server 180) by, e.g., setting release parameters. In one aspect, the user geo-location information includes user information related to a physical location or position of the time display device 120, which are passed to the time display device (or service provider server 180 via the network 160). The user geo-location information may include GPS coordinates (e.g., longitude and latitude) inherent to the time display device 120, such as a mobile cellular phone, and/or zip-code information. The user geo-location information may include user identifier information identifying the user 102. The user 102 may manually set geo-location information, such as a zip code and/or longitude and latitude coordinates.

At step 206, the time display device 120 determines that the current time needs to be adjusted for user 102. In some embodiments, upon detection of a time-related event, the time display device 120 determines whether any user clock (s) need to be adjusted to enable user 102 enough time to take action. In various embodiments, the time display device 120 evaluates user 102's past behavior or history. For example, the user 102 may have a history of running late, not waking up in the morning, being stuck in traffic, etc. In other embodiments, the time display device 120 examines the user 102's habits, how long it take the user 102 to get ready to take action (e.g., shower, get dressed, get gas, etc.), the weather, traffic patterns, current location, current time, location of the event, whether the even requires on-time arrival, early arrival, or if late arrival is acceptable (or preferred by the user 102 or event), etc.

For example, snow or rain may add significant travel time to user 102's commute. Snow can also require the user 102 to wake up early to shovel and to clean off user 102's car. The current time should also be adjusted if the traffic is heavier than usual on the routes that the user 102 takes to get to work or school. Unexpected conditions such as changed arrival/departure times (delay or advancement) of airplane, bus, train, or other mass-transit transportation vehicles can also require time adjustment.

In some embodiments, time display device 120 periodically or continuously consults a database(s) that has updated information pertaining to weather, travel, and/or traffic conditions that are local or pertinent to the user 102. This includes weather information and traffic information. The weather information may include different conditions, such as rain, snow, fog, sleet hail, high winds, and clear. The weather information may also include different intensity, such as heavy, normal and light. Traffic information may also be retrieved if a travel destination is provided, and the traffic information includes travel delays, accidents, travel restrictions (such as no motorcycles on a bridge), etc. Specific information, such as those related to air arrival and departure delay and cancellation may also be retrieved. If there are unexpected conditions, time display device 120 calculates an adjusted time by adding the appropriate delay or advancement to the current time.

In some embodiments, time display device 120 evaluates the one or more physiological characteristics to determine if user 102 is sick. For example, if user 102 has a higher than normal temperature, increased pulse, increased heart rate, disturbed sleep pattern and low physical activity level, time display device 120 may conclude that user 102 is sick. In these cases, time display device 120 may choose not to adjust the current time for user 102 because user 102 is not likely to be leaving the house.

At step 208, if a time adjustment is needed, the time display device 120 calculates how much the current time should be adjusted. The time adjustment can be based on several factors, including the various factors discussed above (amount of traffic, user's habits, weather, user's history, current time, current location, location of the event, whether the user wants to be early or late to the event, etc.). The weather intensity and weather type may determine the magnitude of the time adjustment. Similarly, the intensity of traffic and type of accidents can determine how much the current time should be adjusted. The magnitude of the intentionally introduced error interval, as well as its duration and its timing, may be randomized.

In several embodiments, the time display device 120 evaluates how time adjustment affected user 102 in the past. For instance, time display device 120 can examine if adjusting the current time worked to get the user 102 on time to previous appointments and meetings. If advancing the current time by 20 minutes did not work to get user 102 to a meeting on time, time display device 120 may determine that the current time should be moved forward by 30 minutes or more. If moving the time forward by 20 minutes provided user 102 too much time, then time display device 120 may adjust the time by only 10 or 15 minutes.

In one embodiment, the time display device 120 takes into account the physiological information of user 102. Physiological information can include, for example, physiological data (e.g., vital sign and physical activity data), such as blood pressure, pulse, respiration rate, body temperature, hydration level, physical activity, oxygen consumption, carbon dioxide levels, and glucose or blood sugar level. For example, if user 102's heart rate, blood pressure, and/or respiratory rate are fast and/or high, the time display device 120 may not adjust the time ahead as much as if the user 102 had a regular heart rate, blood pressure, and/or respiratory rate to prevent adding more stress to user 102.

Advantageously, the time display device 120 includes a time adjustment function that belies user avoidance. In certain embodiments, a time advancement may occur from about 30 to about 60 minutes before a predetermined event occurs and continue until the user 102 arrives at the predetermined event or until the time adjustment function is turned-off by the user—at which time the time is returned to real, actual time.

If desired, time adjustment may be disabled on predetermined days or during predetermined times of day. For example, a business person may set the time display device 120 to run accurately at all times except during business hours (9:00 am to 5:00 p.m., Monday through Friday) when fast running intervals are intentionally introduced on an intermittent basis.

In other embodiments, the time of day and day of the week during which time adjustments are introduced may be controlled. In this way, the fast settings may be introduced only when needed. For instance, if a person wanted to get back from lunch earlier each day, the time display device 120 could speed up during the lunch hour, but in a random fashion, so that the user 102 would have to leave earlier to be sure he or she wasn't late for the post-lunch meeting. In addition, the amount by which the time display device 120 is set ahead may be varied in accordance with external conditions; for example, in recognition that a traveler is more likely to be late during the morning and evening "rush hour" when traffic delays can be expected.

The time display device 120 then adjusts the time accordingly. In various embodiments, user 102 may want to be late to an event (e.g., party), where the user 102 does not want to be the first one to the party or knows that the party will start late. In this case, the time display device 120 is adjusted so that the time shown is moved backwards (e.g., one hour earlier). In other embodiments, the user 102 needs to be at the event (e.g., work or flight) earlier than the start time of the event, and the time is adjusted forward (e.g., 30 minutes to one hour later).

In some embodiments, the time display device 120 determines which clocks to adjust and when to adjust the time. For example, time display device 120 may locate the clocks that user 102 typically looks at (e.g., a wristwatch, bedside clock, bedroom clock, microwave clock, oven clock, etc.). In this case, time display device 120 may direct these clocks to move forward or backward a certain amount of time (e.g., 2 hours or 1 hour) before an event (or while user 102 is sleeping). Determining when to adjust the time can be based on various factors, such as start time of the event, user preferences, the magnitude of the adjustment (e.g., larger adjustments should be made earlier and smaller adjustments can be later), user habits (e.g., user usually takes a shower at 7 am so the time can be adjusted at 7 am so that the user does not notice the change), etc.

At step 210, the time display device 120 (or any other clock) displays the adjusted time to the user 102. Once the time is adjusted, the time clock device 120 determines when the user 102 has taken action (e.g., attended the event, left the house, entered a vehicle, etc.) by determining, for example, that user 102 has reached the location of the event, that the user 102 has checked-in at a location, etc. When the adjusted time is no longer needed, the time display device 120 sets the time (and any other clocks with the adjusted time) back to the actual or normal time.

In various embodiments, time display device 120 is capable of showing two or more different times to two or more different users. For example, a first user and a second user may be holding or carrying a mobile computing device that includes a communication subsystem, which can include RF receivers and transmitters and/or optical (e.g., infrared) receivers and transmitters. The specific design and implementation of the communication subsystem can depend on the communication network over which the mobile computing devices are intended to operate. For example, the mobile computing devices can include communication subsystems designed to operate over a Global System for Mobile Communication (GSM) network, a General Packet Radio Service (GPRS) network, an Enhanced Data Rates for Global Evolution (EDGE) network, a Wi-Fi or WiMax network, and a Bluetooth™ network. Time display device 120 may include a beacon that outputs a wireless signal that can be detected by the mobile computing devices when the mobile computing devices are within a certain proximity of the beacon. The beacon may be a device that periodically or continuously transmits a signal, such as a short-distance wireless (e.g., BLE), medium distance wireless (e.g., Wi-Fi), and/or other electro, magnetic, and/or electro-magnetic transmissions. The mobile computing devices are configured to detect the transmitted signals from the beacon, such that when the mobile computing devices are located within the transmission range, the signal may be detected. The mobile computing devices make a connection with the beacon, and can pass user identifiers to the beacon.

Thus, time display device 120 can display one time to the first user and another time to the second user, based on which user is in proximity to the time display device 120. For example, the time display device 120 can show an adjusted, advanced time to the first user (who needs to be at a meeting in 30 minutes), but show the current real time to the second user (who is staying at home all day).

Figure 3:
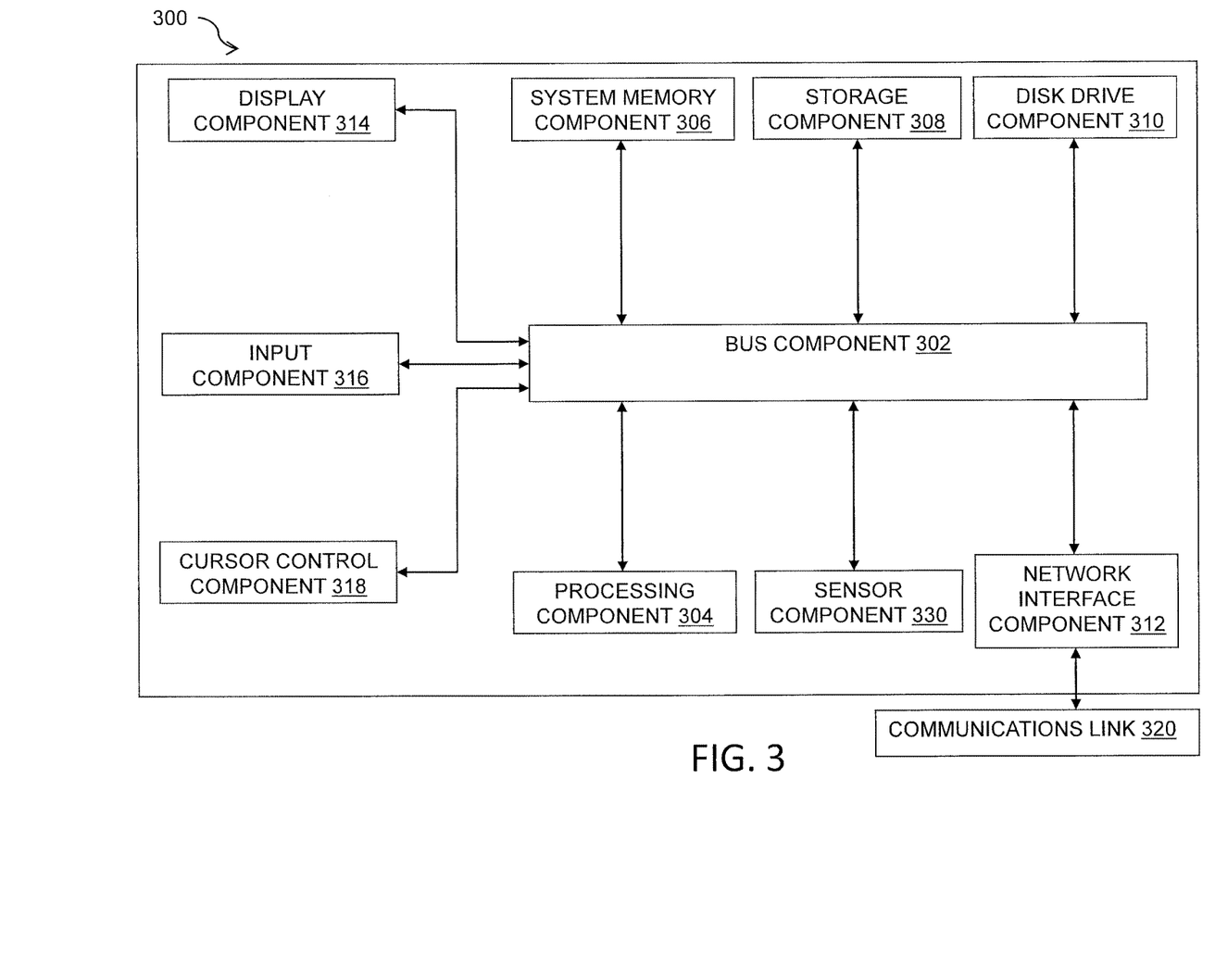
FIG. 3 is a block diagram of a system for implementing one or more components in FIG. 1 according to an embodiment of the present disclosure.

Referring now to FIG. 3, a block diagram of a system 300 is illustrated suitable for implementing embodiments of the present disclosure, including time display device 120 and service provider server or device 180. System 300, such as part of a cell phone, a tablet, a personal computer and/or a network server, includes a bus 302 or other communication mechanism for communicating information, which interconnects subsystems and components, including one or more of a processing component 304 (e.g., processor, micro-controller, digital signal processor (DSP), etc.), a system memory component 306 (e.g., RAM), a static storage component 308 (e.g., ROM), a network interface component 312, a display component 314 (or alternatively, an interface to an external display), an input component 316 (e.g., keypad or keyboard), a cursor control component 318 (e.g., a mouse pad), and a sensor component 330 (e.g., gyroscope, accelerometer, camera, pedometer, heart rate monitor, etc.).

In accordance with embodiments of the present disclosure, system 300 performs specific operations by processor 304 executing one or more sequences of one or more instructions contained in system memory component 306. Such instructions may be read into system memory component 306 from another computer readable medium, such as static storage component 308. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 304 for execution. Such a medium may take many forms, including but not limited to, non-volatile media, volatile media, and transmission media. In various implementations, volatile media includes dynamic memory, such as system memory component 306, and transmission media includes coaxial cables, copper wire, and fiber optics, including wires that comprise bus 302. Memory may be used to store visual representations of the different options for searching, auto-synchronizing, storing access control information, making payments, or conducting financial transactions. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 300. In various other embodiments, a plurality of systems 300 coupled by communication link 320 (e.g., network 160 of FIG. 1, LAN, WLAN, PTSN, or various other wired or wireless networks) may perform instruction sequences to practice the disclosure in coordination with one another. Computer system 300 may transmit and receive messages, data, information and instructions, including one or more programs (i.e., application code) through communication link 320 and communication interface 312. Received program code may be executed by processor 304 as received and/or stored in disk drive component 310 or some other non-volatile storage component for execution.

In view of the present disclosure, it will be appreciated that various methods and systems have been described according to one or more embodiments for displaying an adjusted time.

Although various components and steps have been described herein as being associated with time display device 120 and service provider server or device 180 of FIG. 1, it is contemplated that the various aspects of such servers illustrated in FIG. 1 may be distributed among a plurality of servers, devices, and/or other entities.

Where applicable, various embodiments provided by the present disclosure may be implemented using hardware, software, or combinations of hardware and software. Also where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the spirit of the present disclosure. In addition, where applicable, it is contemplated that software components may be implemented as hardware components, and vice-versa.

Software in accordance with the present disclosure, such as program code and/or data, may be stored on one or more computer readable mediums. It is also contemplated that software identified herein may be implemented using one or more specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, mobile device, server, and other devices described herein.

What is claimed is:

1. A system for displaying an adjusted time to a user comprising:
   a memory device; and
   one or more processors that are configured to execute instructions from the memory device to cause the system to:
      determine that an event will occur at a predetermined time and at an event location;
      determine a current location of a user and a current time;
      determine that the current time should be changed based on the predetermined time, the current location, and the event location;
      in response to determining that the current time should be changed, calculate a time change to the current time based on the current location of the user, the current time, and the event location;
      determine when the time change should be applied;
      determine which of one or more time display devices should be adjusted;
      adjust a time displayed by the determined time display device of the one or more time display devices by the time change, the adjusting causing the adjusted time to be displayed to the user by the determined time display device that is associated with the user;
      determine that the user has taken action to arrive at the event location by the predetermined time; and
      set the determined time display device back to an updated current time.

2. The system of claim 1, wherein determining that the current time should be changed comprises evaluating one or more of the current location of the user, the current time, the event location, weather, traffic, past behavior of the user, and habits of the user.

3. The system of claim 1, wherein calculating the time change is further based on one or more of severity of weather, severity of traffic, and how a previous time adjustment affected the user.

4. The system of claim 1, further comprising one or more sensors configured to measure one or more physiological characteristics of the user.

5. The system of claim 4, wherein the one or more sensors comprise one or more of an accelerometer, gyroscope, actimetry sensor, altimeter, pedometer, heart rate sensor, blood pressure sensor, thermometer, and an oximeter.

6. The system of claim 4, wherein executing the instructions further causes the system to receive one or more physiological characteristics of the user from the one or more sensors and evaluate the one or more physiological characteristics.

7. The system of claim 6, wherein calculating the time change comprises determining, based on the evaluation of the one or more physiological characteristics, that the user is under stress, and that a magnitude of the time change should be minimized to prevent added stress.

8. The system of claim 1, wherein executing the instructions further causes the system to determine that the user has taken the action to arrive at the event location based on a check-in in at the event location with a beacon.

9. The system of claim 1, wherein executing the instructions further causes the system to cause two or more different times to be displayed to two or more different users on respective time display devices, based on a respective proximity of each of the two or more different users to the system.

10. A method of adjusting and displaying a clock time, the method comprising:
    determining an event will occur at a predetermined time and at an event location;
    determining a current location of a time display device of a user and a current time;
    determining to adjust the current time based on the current location, the current time, and the event location;
    in response to determining to adjust the current time, calculating a time change to the current time based on the current location, the current time, and the event location;
    adjusting the current time displayed by the time display device by the time change, the adjusting causing the adjusted time to be displayed to the user by the time display device; and
    determining, based on a new location of the time display device, that the user has arrived at the event location by the predetermined time; and
    in response to determining that the user has arrived at the event location by the predetermined time, causing the time display device to display an updated current time.

11. The method of claim 10, wherein calculating the time change comprises evaluating one or more of severity of weather, severity of traffic, how a previous time adjustment affected the user, and one or more of physiological characteristics of the user.

12. The method of claim 10, further comprising receiving instructions to enable or disable displaying of the adjusted time.

13. The method of claim 12, wherein the instructions comprise disabling displaying of the adjusted time when the time display device has arrived at the event location by the predetermined time.

14. The method of claim 10, wherein the calculating the time change is further based upon whether the event accepts early arrival or late arrival.

15. The method of claim 10, further comprising causing a different time to be displayed to a different user by a different time display device, in response to detecting that the different user is in proximity to the time display device.

16. A non-transitory machine-readable medium comprising a plurality of machine-readable instructions which, when executed by one or more processors, are adapted to cause performance of operations comprising:

determining that a user will be attending an event at an event location at a predetermined time;

determining a current location of the user and a current time;

evaluating the current location, the current time, the predetermined time, and the event location;

in response to evaluating the current location, the current time, the predetermined time, and the event location, applying a random time offset to the current time to generate an adjusted time; and causing the adjusted time to be displayed to the user on a time display device.

17. The non-transitory machine-readable medium of claim 16, wherein the operations further comprise receiving and evaluating one or more physiological characteristics of the user.

18. The non-transitory machine-readable medium of claim 17, wherein the operations further comprise determining, based on the evaluation of the one or more physiological characteristics, that the user is under stress, and that a magnitude of the random time offset should be minimized to prevent added stress.

19. The non-transitory machine-readable medium of claim 16, wherein the operations further comprise displaying a different time to a different user in response to detecting that the different user is in proximity to the time display device.

20. The non-transitory machine-readable medium of claim 16, wherein the operations further comprise:

determining, based on a new location of the time display device, that the user has arrived at the event location by the predetermined time; and in response to determining that the user has arrived at the event location by the predetermined time, causing the time display device to display an updated current time.

* * * * *